June 22, 1937. A. PFISTER Re. 20,422

SOUND TRANSLATING SYSTEM

Original Filed July 14, 1934 2 Sheets-Sheet 1

INVENTOR
Arthur Pfister
BY
Austin & Dix
ATTORNEYS

June 22, 1937. A. PFISTER Re. 20,422

SOUND TRANSLATING SYSTEM

Original Filed July 14, 1934 2 Sheets-Sheet 2

INVENTOR
Arthur Pfister
BY
Austin & Dip
ATTORNEYS

Reissued June 22, 1937 Re. 20,422

UNITED STATES PATENT OFFICE 20,422

SOUND TRANSLATING SYSTEM

Arthur Pfister, Queens Village, N. Y., assignor to Newtone Engineering Inc., New York, N. Y., a corporation of New York Original No. 2,052,110, dated August 25, 1936, Serial No. 735,190, July 14, 1934. Application for reissue April 8, 1937, Serial No. 135,702

29 Claims. (Cl. 179—100.1)

This invention relates to sound record systems and more particularly to electro-acoustical transducers used with sound records for translating and modifying sound selections.

The invention provides, in general, for controlling the reproducing, recording or re-recording of a sound selection according to the characteristics of the selection. The efficiency of the transducer may preferably be controlled by the sound energy whereby the ratio of output to input energy is varied according to the volume of the sound energy.

The system may likewise include suitable tone control devices arranged to produce different transmission characteristics for different frequency registers. The apparent quality of the sound, on reproduction, may thus be improved.

According to a preferred form of the invention as applied to a sound reproducing system a portion of the sound energy may be passed through an amplifier and a frequency selective circuit and fed to a sound output device. Another portion of the sound energy may be passed through a control circuit where it may be averaged and utilized to control the gain ratio of the amplifier. Control is effected preferably by varying the potential applied to a separate control electrode situated in the space discharge path of said amplifier.

Limiting devices may be included in the control circuit to determine the limits to which the control potential may be varied without causing distortion of the selection. The control channel may likewise preferably include sound frequency suppression elements to prevent sound frequencies from reaching the control electrodes and causing distortion of the selection.

Adjustable delay means may also be included in the control channel whereby the rate of change in gain ratio, on crescendo and decrescendo, may be adjusted according to the characteristics of the selection, whether it be speech or music, to render its reproduction more pleasing.

Other refinements of the present system, whereby its operating characteristics are improved and the translation of the sound selection is rendered more perfect, are more fully brought out in the following detailed description.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 shows an embodiment of the invention in a sound reproducing system;

Figure 1:
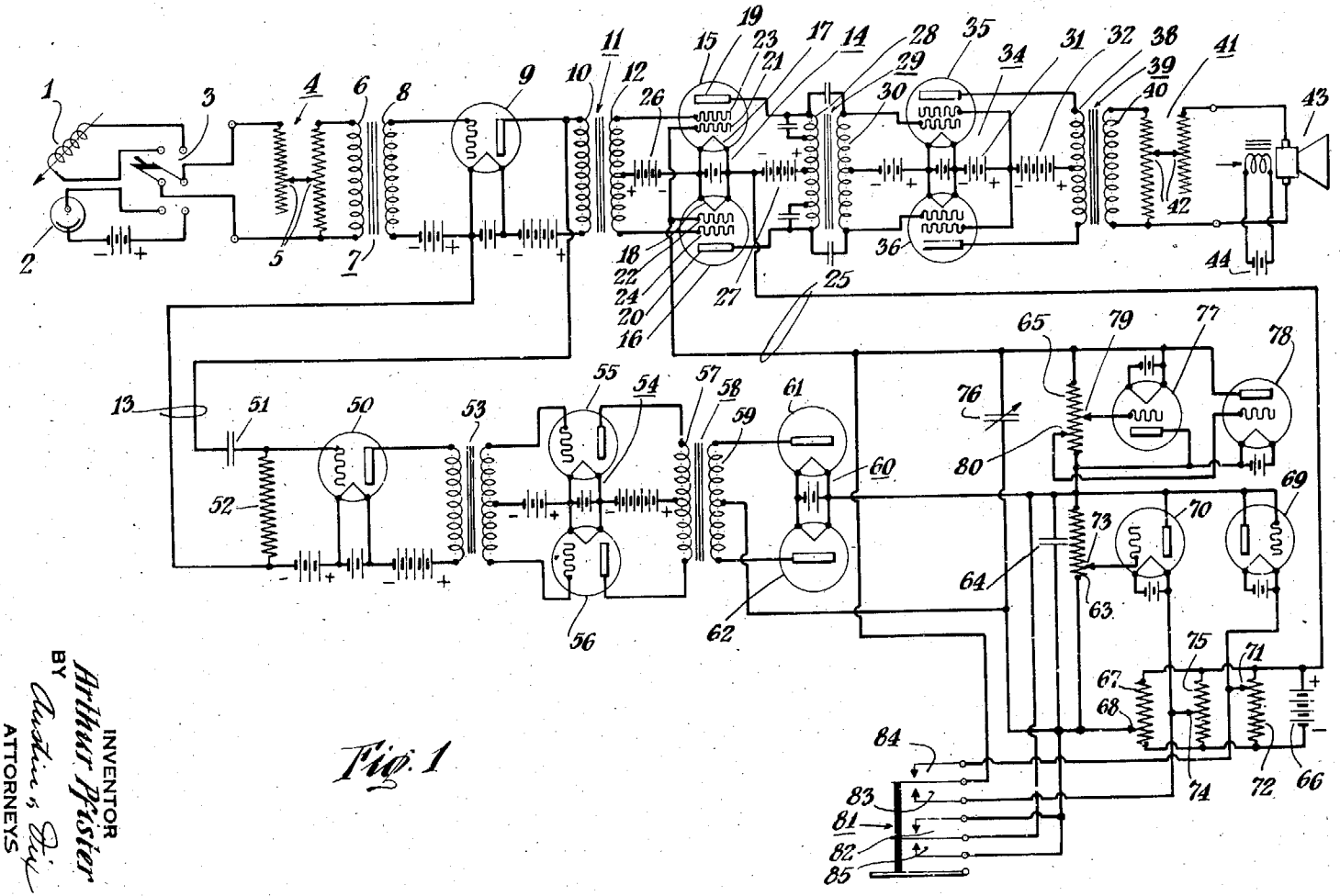

In the following description and in the claims, various details will be identified by specific names for convenience, but they are intended to be as generic in their application as the art will permit.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Fig. 1, a sound reproducing system is shown having an electro-mechanical pick-up device 1 arranged to pick up sound energy from a mechanical sound record and a photoelectric cell 2 arranged to receive sound energy variations from a photographic sound record.

These pick-up devices 1 and 2 are connected to opposite poles of double-pole, double-throw switch 3 adapted to connect either device to the input circuit of potentiometer 4. Potentiometer 4 is provided with sliding contacts 5 arranged to vary the input of energy to primary winding 6 of transformer 7.

Secondary winding 8 of transformer 7 is connected in the input circuit of vacuum tube amplifier 9. The output circuit of amplifier 9 comprises the primary winding 10 of audio-frequency transformer 11 and also the input circuit 13 of the control channel.

Secondary winding 12 of transformer 11 is connected in the input circuit of amplifier 14 comprising tetrode vacuum tubes 15 and 16. Tube 15 contains cathode 17, anode 19 and two grid or control electrodes 21 and 23. Tube 16 contains cathode 18, anode 20 and two grid or control electrodes 22 and 24.

Control electrodes 21 and 22 are located nearest the cathodes and are connected to the output circuit 25 of the control channel, as will be more fully described later.

Control electrodes 23 and 24 are located nearest the anodes and may, if desired, comprise screen or shield grids for the anodes. These control electrodes are connected to the ends of secondary winding 12 of transformer 11. Winding 12, with biasing battery 26 connected to the mid-point thereof, thus provides part of the sound energy input circuit for amplifier 14. By connecting the input circuit to the shield electrodes 23 and 24 (as shown) distortion will be kept at a minimum. It is quite feasible, however, and within the scope of the present invention, to connect the signal input circuit to grids 21 and 22 and the control circuit to grids 23 and 24.

The anode or output circuit of amplifier 14 comprises primary winding 28 of audio-frequency transformer 29. The mid-point of winding 28 is connected to plate biasing battery 27.

Transformer 29 is designed with certain desired frequency characteristics whereby it will act as a band-suppression filter at low signal volumes to reduce the transmission of the intermediate frequency registers to a greater extent than the high and low registers. At high signal intensities, however, the transformer has substantially uniform efficiency throughout the audible frequency range.

The correct design for transformer 29 may be determined by well known and standard methods and will depend upon the characteristics of the amplifier tubes 15 and 16 with which it is to be connected. In any event, certain sections of the transformer windings are tuned to discriminate against intermediate frequencies. With a tuned circuit of this type it is well known that the frequency discriminating effect will be a direct function of the circuit impedance. In the present instance the impedance will be determined by the amplifier resistance which, in turn, is determined by the biasing of the control electrodes.

When the tube impedance is high the input load for the transformer primary 28 is negligible. Under these conditions the frequency discrimination is most effective and the transmission of high and low frequencies is accentuated due to the tuning of the transformer. When the tube impedance is lowered the input load for primary 28 will be raised and the frequency discrimination will decrease until substantially uniform response over the entire frequency range will be obtained for high signal volumes.

Secondary winding 30 of transformer 29 is connected in the input circuit of push-pull amplifier 34 comprising vacuum tubes 35 and 36. In the present embodiment the input circuit is connected to the inner grids which are adjacent to the cathodes. The "shield" grids (nearer to the anodes) are connected through biasing battery 31 to the cathodes.

The output circuit of amplifier 34 includes the primary 38 of output transformer 39. The mid-point of winding 38 is connected to the cathode through plate biasing battery 32 and battery 31. The secondary 40 of output transformer 39 is connected through potentiometer 41 to the moving coil of loud-speaker 43. The fixed coil of the speaker is supplied with current by means of battery 44. Potentiometer 41 is provided with sliding contacts 42 for varying the volume of the output signal.

The control circuit has its input circuit 13 connected across the output of amplifier tube 9. Circuit 13 is connected to the input of amplifier tube 50 in the control circuit by a condenser-resistance coupling comprising condenser 51 and resistance 52. The output of amplifier 50 is connected through transformer 53 to push-pull amplifier 54 comprising vacuum tubes 55 and 56.

The output of push-pull amplifier 54 includes the primary 57 of transformer 58. Secondary winding 59 of transformer 58 is connected to the anodes of a pair of two element thermionic tubes 61 and 62, together comprising a full-wave rectifier 60.

The center of secondary winding 59 and the cathodes of tubes 61 and 62 are connected to opposite ends of resistance 63, which will hereafter be called the control resistance. Current from rectifier 60 will pass through control resistance 63 rendering the upper end of the resistance (as seen in Figure 1) positive with respect to the lower end.

Connected in parallel with resistance 63 is a condenser 64 which serves as a filter for the audio-frequency fluctuations in the rectified current from rectifier 60. The current through resistance 63 will thus be averaged to represent the envelope of the rectified currents or, in other words, the intensity of the audio-frequency signal.

Control resistance 63 comprises part of the output circuit 25 of the control channel. The entire output circuit includes the following elements in series: control grids 21 and 22 of amplifier 14, resistance 65, control resistance 63, biasing potentiometer 67 and cathodes 17 and 18 of amplifier 14. Biasing battery 66 is connected in parallel with potentiometer 67 to furnish a potential gradient across the potentiometer. The normal or initial bias on control grids 21 and 22 may be adjusted by moving sliding contact 68 along potentiometer 67.

Discharge devices 69 and 70 are connected across control resistance 63 and serve to limit the potential which can be developed across this resistance. The cathodes of these tubes are connected to sliding contacts 71 and 74 adapted to slide on potentiometer resistances 72 and 75, respectively, both of which are connected across biasing battery 66 in the same manner as potentiometer 67.

The anodes of tubes 69 and 70 are both connected to the positive end of control resistance 63. The grid of tube 69 is connected directly to the anode or plate of the tube. The grid of tube 70, however, is connected to contact 73 arranged to slide on control resistance 63.

A variable delay arrangement is also associated with output circuit 25 of the control channel. This delay arrangement comprises resistance 65 connected in output circuit 25 and variable condenser 76 connected across both resistances 63 and 65. These elements form a condenser-resistance discharge device the inertial characteristics of which may be varied by adjusting variable condenser 76.

Connected in parallel with resistance 65 are two three-element vacuum tubes 77 and 78. These tubes are connected in parallel opposing relation, that is, the anode of tube 77 and the cathode of tube 78 are both connected to one end of resistance 65 and the cathode of 77 and anode of 78 to the other end. The grid elements of tubes 77 and 78 are connected, respectively, to sliding contacts 79 and 80 arranged to slide on resistance 65. Thus the grid biases of the tubes may be varied independently to regulate the individual internal impedance of these tubes. The inertial or delay action may thus be separately regulated for build-up and decay of biasing potential across output circuit 25.

Control cut-off switch 81 is connected across the control channel for shunting the control resistance, when desired, to cause the sound amplifier to operate without variation in its gain ratio, i. e., without dynamic expansion. When switch 81 rests in the middle or normal position (as shown) dynamic expansion will take place. If the switch is thrown to the "up" position the control resistance is shunted and the sound amplifier connected to operate without dynamic expansion at a gain ratio which will be determined by the setting of biasing contact 71 associated with potentiometer 72. If the switch 81 is thrown to the "down" position, the control resistance is shunted to eliminate dynamic expansion, and the gain ratio of the amplifier will be determined by the setting of biasing contact 74 associated with potentiometer 75.

*Operation*

In the operation of the system in reproducing a selection from a mechanical sound record, pick-up device 1 is placed in operative relation to the moving sound track of the record, or if a photographic recording is used, cell 2 is arranged to receive light variations from the moving photographic sound track. The chosen pick-up device is connected by switch 3 to potentiometer 4. Contacts 5 are adjusted to allow a desired volume of input energy to reach transformer 7.

The sound energy passes through transformer 7 and is amplified by amplifier 9. Part of the amplified energy passes through transformer 11 and is further amplified by push-pull amplifier 14 whose gain ratio is simultaneously varied by the control grids 21 and 22.

The control of the gain ratio is brought about as follows: Part of the signal energy which has been amplified by vacuum tube 9 is fed through control input circuit 13 and the condenser-resistance coupling 51, 52 to amplifier 50. The output energy from amplifier 50 passes through transformer 53 and is further amplified by push-pull amplifier 54. The output of 54 passes through transformer 58.

The resulting alternating current is rectified by full wave rectifier 60 to yield a direct current which passes through control resistance 63 from the cathodes of rectifier 60 to the center of secondary winding 59 of the transformer. It will be obvious that the average strength of this direct current over any limited interval will be directly proportional to the strength of the input signal. Condenser 64 serves to filter out the audio-frequency fluctuations of the rectified current. The current through resistance 63 will then represent an envelope of the rectified current impulses.

The potential across resistance 63 will accordingly be varied along with the strength of the rectified current, the upper end of the resistance (as shown in Fig. 1) being made positive with respect to the lower end. This control potential opposes the biasing potential from battery 66. Thus, an increase of signal strength will cause a decrease of negative bias on the control electrodes 21 and 22 thereby decreasing the impedance of the space discharge paths of tubes 15 and 16. The gain ratio of tubes 15 and 16 will accordingly be increased so that they will have a greater amplifying effect on the audio-frequency signals. By such control action the gain ratio of amplifier 14 may in some instances be varied over a range of 30 decibels between low and high signal volumes.

By adjusting contact 68 on potentiometer 67 the initial bias on the control electrodes and hence the initial amplification setting of the amplifier tubes 15 and 16 may be adjusted to any desired value.

Discharge tubes 69 and 70 serve to limit the change in bias which the control circuit may produce on the control electrodes. Tube 69 prevents the control channel from causing more than a predetermined maximum change in the bias of control electrodes 21 and 22. Tube 70 controls the percentage change in bias which the control channel may bring about for any signal volume.

Figure 2:
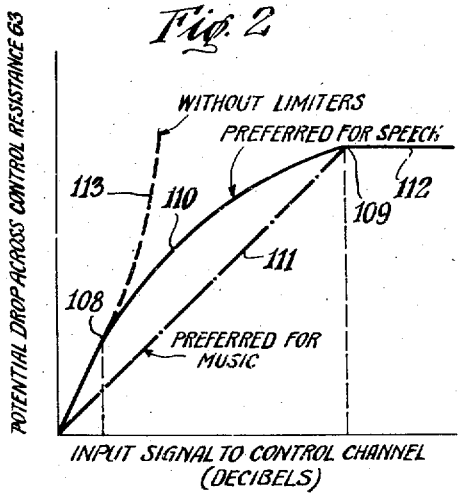
Fig. 2 is a diagram illustrating limiting control action.

The action of the limiter tubes may be illustrated by referring to Fig. 2 in conjunction with Fig. 1. With the setting of the potentiometer contacts 68, 71 and 74, as shown (Fig. 1) the anodes of limiting devices 69 and 70 will be negatively biased with respect to their cathodes as long as no current is passing through resistance 63. When rectified signal current passes through resistance 63, thereby causing a potential drop in this resistance, the anodes of devices 69 and 70 will be made less negative and will occasionally become positive with respect to their cathodes when the higher signal volumes are reached. The anode of device 70, for example, will become positive when the potential drop across resistance 63, determined by the volume of input signal, has reached a value sufficient to overcome the initial bias on the anode. This is represented by point 108 in Fig. 2. When this potential value is reached a discharge will begin between the anode and cathode of device 70, this device thereby serving to shunt a portion of the current received from rectifier 60.

While the anode or plate bias of tube 70 is varied by the change in total potential drop across control resistance 63 the grid bias of this tube may be varied as any fraction of the potential drop across the control resistance. This fraction is determined by setting sliding contact 73 to any desired point on the control resistance. Accordingly, device 70 will have a variable impedance the value of which is determined by the potential drop across control resistance 63.

Thus by setting contacts 73 and 74 the potential drop across control resistance 63, and hence the expansion characteristics of the amplifier, may be adjusted to correspond to any one of several desired functions of the signal volume.

In the reproduction of speech, it has been found desirable to adjust contacts 73 and 74 so that the potential drop across resistance 63 has the values indicated by curve 110 for various values of input signal. In the reproduction of music the potential drop may preferably have the values shown by curve 111.

Should the input energy approach very high values, there is danger that the bias on control electrodes 21 and 22 may be reduced to an unduly small negative value thereby causing distortion of the signal. Such excessive changes in the bias are prevented by discharge tube 69. When the potential drop across control resistance 63 increases to a point where it is sufficient to overcome the initial bias of tube 69 (indicated by point 109, Figure 2) this tube will begin to discharge. Since the grid element of tube 69 is connected directly to the anode, the impedance of this tube will be reduced to a very low value whenever the initial bias on the tube is thus overcome. Tube 69 will thus shunt the control resistance when high volume signals are received and the potential drop across the control resistance will accordingly be prevented from exceeding a predetermined maximum value. For all signals above a predetermined volume the potential drop across control resistance 63 will thus be held to a substantially constant value (indicated by horizontal line 112 in Figure 2) and the gain ratio of the amplifier will, of course, also be constant.

The effect of the limiter tubes in shaping the gain characteristics will be more evident by comparing the above mentioned curves with curve 113 (Figure 2) which represents the variation in control potential for various values of input signal volume when no limiting devices are used.

During reproduction sudden changes in signal volume will often occur, as on rapid crescendo and rapid decrescendo. By variously delaying the change in gain ratio of the amplifier when these changes in signal occur a more pleasing and natural effect will be obtained. The variable delay circuit permits separate adjustment of the delay for crescendo and decrescendo.

If a sudden increase in signal volume occurs during reproduction, as on rapid crescendo, the potential drop across control resistance 63 will increase immediately. The change in potential applied to the control electrodes will be delayed, however, due to the action of the variable delay circuit. The length of delay will depend on the capacity of condenser 76 and the impedance of tube 77. Likewise, on sudden decrease of signal volume, as on rapid decrescendo, the potential drop across resistance 63 will decrease with the decrease in volume but the change in potential on the control electrodes will be delayed. The length of delay will depend on the capacity of condenser 76 and the impedance of tube 78. Adjustment of the capacity of condenser 76 will accordingly vary the delay for both crescendo and decrescendo.

In addition, separate adjustment of delay on crescendo and decrescendo is afforded by space discharge tubes 77 and 78. By adjusting contact 79 with respect to resistance 65, the shunting action of tube 77 for resistance 65 on crescendo will be varied. Similarly, by adjusting contact 80 with respect to resistance 65, the shunting action of tube 78 for this resistance on decrescendo will be varied. Thus the delay on crescendo and decrescendo may be adjusted by moving contacts 79 and 80 to separate values most desirable for the individual selection to be rendered.

Figure 3:
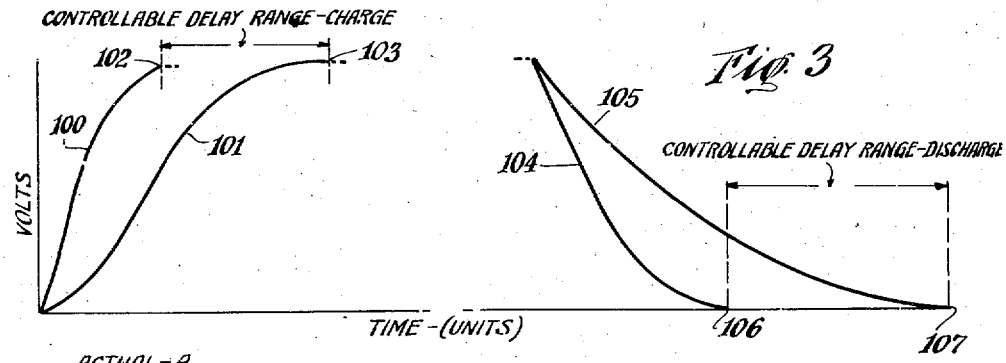
Fig. 3 is a diagram illustrating the controllable delay on crescendo and decrescendo.

Fig. 3 illustrates diagrammatically the delay on crescendo and decrescendo, the curves representing the change in potential across condenser 76 on build up and decay of signal. It is obvious that the gain ratio of amplifier 14 can be represented by similar curves.

Curve 100 shows the charging rate of the condenser for rapid attack or build up of amplification. In this instance, contact 79 will be set near the lower end of resistance 65 (as shown in Fig. 1) and the impedance of tube 77 will be low. Curve 101 shows the charging rate of the condenser for slow attack or build up of amplification. The time indicated on the graph by the distance between points 102 and 103 represents the variation in delay which may be achieved by adjusting contact 79.

Curves 104 and 105 represent the rates of discharge of condenser 76 on signal volume decay or decrescendo. Curve 104 shows the discharging rate of the condenser when contact 80 is set for rapid decay of the signal (i. e. set near the upper end of resistance 65, as shown in Fig. 1). Curve 105 shows the discharging rate of the condenser for slow decay or falling off of amplification. In this case, the contact 80 would be set near the lower end of resistance 65 as shown in Fig. 1. The time represented on the graph by the distance between points 106 and 107 represents the variation in delay on descrescendo which may be achieved by adjusting contact 80.

It will usually be found desirable with high quality recordings to adjust the variable delay circuit to cause rapid attack and slow decay of the gain ratio with changes in signal volume. In some instances other settings may be found useful and can readily be obtained by adjusting condenser 76 and contacts 79 and 80.

In case it is desired to operate the amplifier without dynamic amplification, i. e. without change of the gain ratio of the amplifier during the rendering of the selection, switch 81 is moved to the "up" or "down" position (as shown on Fig. 1). If the switch is moved to the "up" position the control electrodes are given a steady bias the value of which is determined by the position of contact 71 on potentiometer 72. If switch 81 is thrown to the "down" position, the control electrodes are given a steady bias determined by the position of contact 74 on potentiometer 75. It will thus be seen that the amplifier may be set to operate at any one of a plurality of steady gain ratios by simply operating switch 81.

Switch 81, in combination with potentiometer contacts 71 and 74, provides a convenient means for testing and adjusting the bias on the limiting devices 69 and 70. Thus by moving the switch 81 to the "up" position and then adjusting contact 71 to give amplifier 14 the maximum gain ratio at which it is desired to operate, and then returning the switch to the middle position, tube 69 will be given a bias which will cause it to shunt the control resistance when the said maximum value of gain ratio is reached. If switch 81 is thrown to the "down" position, contact 74 may be manipulated. In this case the resulting gain ratio of amplifier 14 will indicate the point at which tube 70 will start to shunt the control resistance when the switch is again set for dynamic expansion.

With the switch 81 set for dynamic expansion the audio-frequency signal passing through transformer 11 will be variably amplified by amplifier 14 under control of the control channel and will then be fed through transformer 29 to amplifier 34. Here it is further amplified and fed to loud speaker 43 through transformer 39 and potentiometer 41. The volume of output may be adjusted by moving contacts 42 associated with potentiometer 41.

The separate control electrodes in amplifier 14, by isolating the control channel from the audio-frequency channel, prevent distortion of the signal by any audio-frequencies which are not filtered out of the control current by condenser 64. Likewise, any even harmonics of the audio-frequency signal introduced into the output circuit of amplifier 14 by the control circuit, will be suppressed due to the push-pull arrangement of tubes 15 and 16.

Figure 4:
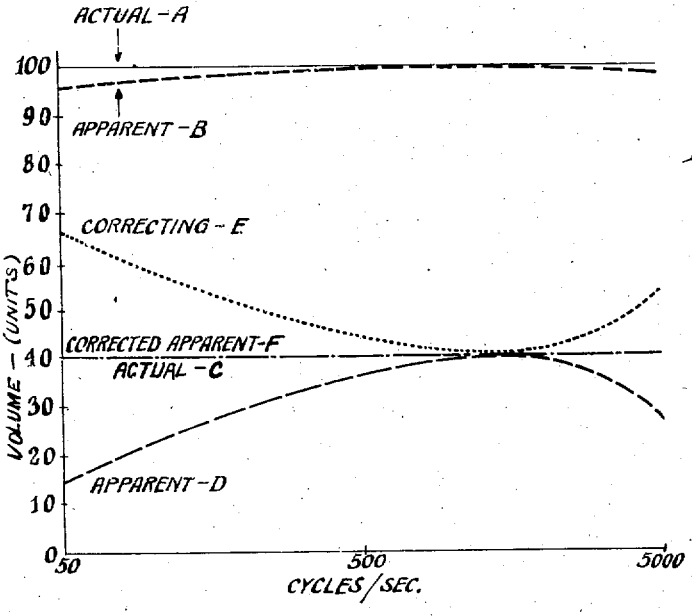
Fig. 4 is a diagram illustrating tone compensating action.

Transformer 29 will exert a frequency selective effect on the signal (as brought out above), i. e.

for low signal values the high and low frequency registers will be accentuated. For high volumes all frequencies will be transmitted with substantially equal efficiency. It is well known that when the volume of a sound is decreased the sensitivity of the human ear to the low and high frequency components falls off more rapidly than the sensitivity to the intermediate frequencies. The present frequency selective arrangement compensates for this peculiarity or defect of the ear, whereby selections reproduced at lower volume levels than the original rendition will produce proportionally the same effect on the ear of the listener for all frequency registers. This effect is illustrated diagrammatically in Fig. 4.

If a highly intensity sound were produced having all frequencies present in equal intensities throughout the audible frequency range, the intensity at all frequencies would be represented on the diagram (Fig. 4) by a horizontal line A, which gives the actual intensity of the sound in decibels for any frequency. The effect on the ear of a listener, or the apparent intensity at different frequencies for this sound, will then be represented by curve B.

If the sound were reproduced with the volume uniformly lowered through the frequency range, the output intensity of such a "perfect" reproducer would be represented by horizontal line C. For this decreased intensity, however, the high and low frequency tones are decreased in apparent intensity to a greater extent than intermediate frequency tones, i. e. the ear of a listener will be affected to a lesser extent by the low volume high and low frequency tones than by the low volume intermediate frequency tones, as indicated in curve D.

The present reproducing circuit is arranged to compensate for this peculiarity of the human ear by reproducing the high and low frequencies with less reduction from the original intensities than the intermediate frequencies. This is illustrated in curve E, which represents the actual intensity on reproduction by the present circuit, of a sound having an original frequency distribution represented by curve A.

The effect on the ear of the low volume sound represented in curve E, would then be equal for all frequencies, as indicated by horizontal line F, which coincides with horizontal line C on the frequency distribution diagram. The original high intensity sound is thus reproduced at a lower intensity while preserving substantially the same effect of all frequencies on the ear as would be produced by the original sound.

By adjusting input potentiometer 4, the frequency control action may be reduced or increased. By reducing the input, for example, the frequency characteristics of transformer 29 may be made nearly independent of signal volume. The output volume, of course, may be kept the same (when the input is reduced) by adjusting potentiometer 41.

From the foregoing it may be seen that there has been produced an improved sound control system wherein the amplification is controlled according to the volume of signal energy. This system likewise includes limiting devices for limiting the range of the gain variations and adjusting the percentage thereof within certain predetermined desired limits. Adjustable delay devices are likewise provided which make it possible to separately vary the rate of increase and decrease of sound volume on crescendo and decrescendo. Furthermore, automatic tone compensating means are provided whereby sounds may be reproduced in a normal manner for all signal volumes. Various other features have been provided whereby the operation of the system in controlling sound energy has been improved.

It will be recognized that in the recording of selections on sound records of either mechanical or photographic type there are certain upper and lower limits of volume above or below which satisfactory recording cannot be obtained. It is, therefore, necessary, or at least desirable, to compress or contract the volume range on recording and to expand the range on reproducing.

Figure 5:
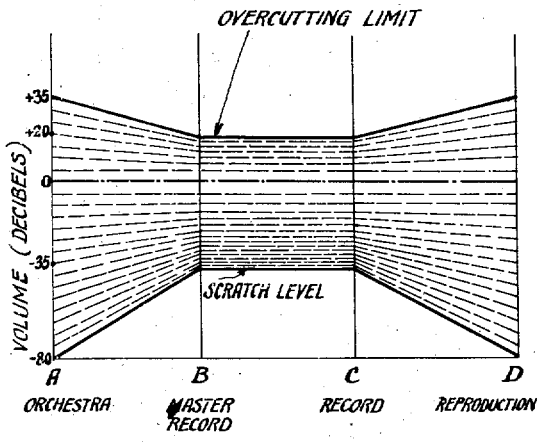
Fig. 5 is a diagram of the variation in volume range of a selection on recording and reproducing.

Fig. 5 illustrates one manner in which recording and reproducing might be carried out. In this figure the sound volumes indicated along the vertical line A represent various volume levels of musical sounds produced by a symphony orchestra. For purposes of comparison the fiducial or reference point, marked 0 decibels on the scale, has been taken to represent a volume level equal in electrical units to the power dissipated in a 500 ohm resistance having 2.5 volts across its terminals. The loudest sound reached by the orchestra may then have a value of 35 decibels above the reference level and the softest sound may be substantially 80 decibels below that reference level, as shown. This minus 80 decibel point will correspond substantially to the threshold of hearing.

Even with modern high quality recording, the soft notes must be amplified before recording in order to bring them above the volume level of the background noises, such as scratch introduced by irregularities in the record. The loudest sounds on the other hand, must be attenuated in intensity in order to avoid overcutting of the sound track. For satisfactory high quality recording, the sounds might preferably be contracted to a volume range between plus 20 and minus 35 decibels as indicated in the area between A and B (Fig. 5). The sound may then be satisfactorily recorded.

On reproduction it is desirable to simulate the volumes of sound produced by the original sound source and hence the volume range may preferably be expanded as indicated in the area between C and D of Fig. 5. It will be noted that the softer sounds are actually decreased in volume on reproduction and thus needle scratch and background noises are suppressed or eliminated.

The present circuit presents an ideal means for reproducing and expanding the sound selection. It will be noted, however, that applicant's circuit is likewise adaptable for recording the sounds in which case the circuit will be arranged to compress the volume range as indicated in the area between A and B (Fig. 5).

While certain novel features of the invention have been disclosed and are pointed out in the annexed claims, it will be understood that various omissions, substitutions and changes may be made by those skilled in the art without departing from the spirit of the invention.

What is claimed is:

1. In an energy translating system for use with a sound record a first translating device, a second translating device fed thereby and means between said devices for discriminating against intermediate sound frequencies when the signal energy is low and for passing all sound frequencies with substantially equal efficiency when said energy is high.

2. In a sound record system, a pick-up device, a filter network fed thereby, said network being adapted to reduce the transmission of intermediate audio-frequencies, means to reduce the discriminating effect of said network responsive to high signal intensities and a translating device fed by said network.

3. In a sound translating system for use with a sound record, a first translating device, an amplifier fed thereby, a transformer fed by said amplifier, said transformer discriminating against intermediate sound frequencies when said amplifier impedance is high and passing all sound frequencies with substantially equal efficiency when said amplifier impedance is low, and a second translating device fed by said transformer.

4. In a sound reproducing system for use with a sound record, a pick-up device, an output device fed thereby, means between said devices for discriminating against intermediate frequencies when the signal volume is low and for passing all frequencies with substantially equal efficiency when the signal volume is high.

5. The method of improving the characteristics of sound on reproduction from a sound record which comprises reproducing the high and low sound frequency registers in higher ratio of volume to the intermediate frequencies for low sound volumes than for high sound volumes.

6. In a sound translating system for use with a sound record, a first translating device, an amplifier fed thereby, a second translating device fed by said amplifier, a control circuit for varying the gain ratio of said amplifier and a governing device for varying the effectiveness of the control exercised by said control circuit over a substantial range of signal volumes.

7. In a sound translating system for use with a sound record, a first translating device, an amplifier fed thereby and a second translating device fed by said amplifier, a control circuit fed by said first translating device for changing the gain ratio of said amplifier according to a function of the energy received by said control circuit and a device for governing the effect of said control circuit whereby said function may be varied.

8. In a sound translating system for use with a sound record, a first translating device, an amplifier fed thereby and having a control electrode, a second translating device fed by said amplifier, means for varying the gain ratio of said amplifier comprising a control circuit having a biasing resistance for determining the bias on said control electrode, and a discharge tube connected in shunt with said resistance, said tube having a control electrode connected to an intermediate point on said biasing resistance.

9. In a sound reproducing system for use with a sound record, a pick-up device, an amplifier fed thereby and an output device fed by said amplifier, a control circuit for varying the gain ratio of said amplifier, a first limiting device for determining the effectiveness of said control circuit over a continuous range of values, and a second limiting device for determining the maximum effectiveness of said control circuit.

10. The method of predetermining the maximum gain ratio of a dynamic amplifier used in a sound translating system for a sound record and having a limiting device associated therewith which comprises adjusting the setting of said amplifier to operate at said maximum gain ratio and causing said setting to determine the point above which said limiting device will become effective.

11. In a sound translating system for use with a sound record, a first translating device, an amplifier fed thereby, a second translating device fed by said amplifier and a control circuit for varying the gain ratio of said amplifier, said control circuit having a timing arrangement comprising a variable impedance and a variable capacitance for determining its rate of action.

12. In a sound translating system for use with a sound record, a first translating device, an amplifier fed thereby and having a control electrode, a second translating device fed by said amplifier, means for varying the gain ratio of said amplifier comprising a control circuit having a biasing impedance for determining the bias on said control electrode, said control circuit having means for delaying the control action, said means comprising a second impedance and a variable condenser.

13. In a sound translating system for use with a sound record, a first translating device, an amplifier fed thereby and having a control electrode, a second translating device fed by said amplifier, a control circuit for varying the gain ratio of said amplifier and having a biasing impedance for determining the bias on said control electrode, and a timing circuit for determining the rate of control action and comprising a second impedance in series with said biasing impedance and means for varying the value of said impedance.

14. In a sound translating system for use with a sound record, a first translating device, an amplifier fed thereby and having a control electrode, a second translating device fed by said amplifier, a control circuit for varying the gain ratio of said amplifier fed by said first translating device and having a biasing resistance in the circuit of said control electrode, a second resistance in series with said biasing resistance and said electrode, a capacitance in shunt with said two resistances, an impedance in shunt with said second resistance and means for varying the value thereof.

15. In a sound translating system for use with a sound record, a first translating device, a second translating device fed thereby, a control electrode for varying the efficiency with which audio-frequency energy is transmitted from said first to said second device according to the potential applied thereto, means for varying the potential applied to said electrode comprising a circuit element having a variable potential gradient across its terminals, an impedance in series with said circuit element, a capacitance in shunt with said element and said impedance and means for adjusting the effective value of said impedance.

16. In a system for reproducing sound from a sound record, a pick-up device, an amplifier fed thereby and having a control electrode, a translating device fed by said amplifier, a control circuit fed by said pick-up device for varying the gain ratio of said amplifier, a timing circuit connected between said control circuit and said control electrode, said timing circuit comprising a capacitance and a resistance in the charging and discharging circuit of said capacitance, a pair of unidirectional discharge devices oppositely connected in shunt with said resistance and means for separately adjusting the impedance of said discharge devices.

17. In a system for reproducing sound from a sound record, a pick-up device, an amplifier fed thereby and an output device fed by said amplifier, a control circuit fed by said pick-up device for varying the gain ratio of said amplifier according to a moving average of the signal energy, means for delaying the action of said control circuit and means separately varying the length of delay for crescendo and for decrescendo.

18. In an energy translating system for use with a sound record, a first translating device, a transformer fed thereby, means rendering said transformer normally selective to predetermined frequency bands, means rendering said transformer non-selectively responsive to high signal volumes and a second translating device fed by said transformer.

19. In a sound reproducing system for use with a sound record, a pick-up device, an output device fed thereby, and means between said devices for selectively discriminating against a predetermined band of recorded sound frequencies when the sound volume is low and for passing all recorded sound frequencies with substantially equal efficiency when said volume is high.

20. In a sound translating system for use with a sound record, a first translating device, an amplifier fed thereby and a second translating device fed by said amplifier, a control circuit fed by said first translating device for varying the gain ratio of said amplifier responsive to the energy received from said device, and a variable limiter for varying the degree of control exercised by said control circuit responsive to the energy received by said control circuit.

21. In a sound translating system for use with a sound record, a first translating device, an amplifier fed thereby and having a control electrode, a second translating device fed by said amplifier, means to vary the gain ratio of said amplifier comprising a control circuit including a biasing resistance for determining the bias on said control electrode, a discharge device connected in shunt with said resistance, a grid electrode for determining the impedance of said discharge device, and means for controlling the bias on said grid electrode responsive to the potential drop across said biasing resistance.

22. In a sound translating system for use with a sound record, a first translating device, a second translating device fed thereby, a control electrode for varying the efficiency with which audio-frequency energy is transmitted from said first to said second device according to the potential applied thereto, means for varying the potential applied to said electrode comprising a circuit element having a variable potential gradient across its terminals, an impedance in series with said circuit element, a capacitance in shunt with said element and said impedance, and means for adjusting said impedance to have different values for charge and for discharge of said capacitance.

23. In a sound record system, a pick-up device, an amplifier fed thereby and a translating device fed by said amplifier, said amplifier having a signal input grid and having a negatively biased control grid for varying the amplification characteristics of the amplifier in accordance with the signal strength.

24. In an energy translating system for use with a sound record, a first translating device, a space discharge device having a grid connected to receive audio-frequency variations from said first translating device and a separate, negatively biased grid connected to vary the transmission characteristics of said discharge device in accordance with the energy value of said audio-frequency variations and a second translating device fed by said discharge device.

25. In a sound reproducing system for use with a sound record, a pick-up device, an amplifier fed thereby and a translating device fed by said amplifier, said amplifier comprising a space discharge device having an anode, a first control electrode fed by audio-frequency variations from said pick-up device and a second negatively biased control electrode fed by sub-audio-frequency variations from said pick-up device for controlling the gain characteristics of said amplifier.

26. In an audio-frequency amplifier system, a gain control stage comprising a vacuum tube having an anode, a cathode, a first control electrode and a second negatively biased control electrode, means for applying audio-frequency variations to said first control electrode and means for applying sub-audio control variations to said second negatively biased control electrode.

27. In an audio amplifier of the type including a space discharge device having a cathode, a signal input electrode, a signal output anode and at least one auxiliary negatively biased control electrode, automatic means actuated in accordance with an increase in average audio input intensity for adjusting the negative bias of said auxiliary electrode in a positive polarity direction with respect to said cathode whereby the gain of said device is increased with an increased input signal.

28. In an audio amplifier system of the type provided with an amplifier tube coupling the audio signal input circuit to the audio utilization circuit, said tube including a cathode, a signal grid, an output electrode and at least one negatively biased control electrode functioning as a gain control electrode, said signal grid and cathode being connected to said input circuit, an audio range expansion network comprising an audio signal amplifier having an input circuit arranged to have audio signals impressed thereon, means for developing a direct current potential from rectified audio signals and means impressing said direct potential on said negatively biased electrode in a polarity sense such that the amplifier gain increases with increase in audio signal intensity.

29. The method of obtaining gain variations in a signal amplifier forming part of a sound energy translating system and having an anode and a plurality of control electrodes, at least one of which is negatively biased which comprises introducing sub-audio control variations into said system through said negatively biased control electrode and introducing audio-frequency variations into said system through the other of said control electrodes.

ARTHUR PFISTER.